June 23, 1970 P. A. STAHR 3,516,301

REMOTE CONTROL ASSEMBLY

Filed March 18, 1968

INVENTOR.
Peter A. Stahr
BY
Barnard, McGlynn & Reising
ATTORNEYS

United States Patent Office 3,516,301
Patented June 23, 1970

---

3,516,301
REMOTE CONTROL ASSEMBLY
Peter Anton Stahr, Pontiac Township, Mich., assignor to Teleflex, Inc., North Wales, Pa., a corporation of Delaware
Filed Mar. 18, 1968, Ser. No. 713,963
Int. Cl. F16c 1/10
U.S. Cl. 74—501   16 Claims

ABSTRACT OF THE DISCLOSURE

A motion transmitting remote control assembly of the type which is operated to control a device by transmitting tension or compression in a curved path by a flexible core element and including a control body having a wall with an elongated slot therein and a slider member slidably supported by the control body for bearing engagement with one face of the wall and extending through the slot. An elongated member is snapped onto and retained on the slider member and is in bearing engagement with the opposite face of the wall for providing a predetermined resistance to the sliding movement of the slider member. The elongated member has spaced pads at each end thereof and in sliding engagement with the control body for attenuating the mechanical advantage and the resulting excessive forces which resist sliding movement as forces are applied to the slider member.

---

Remote control assemblies of the type to which the instant invention pertains are typically used in marine, aircraft and automotive vehicles. Such remote control assemblies are frequently used in automobiles for controlling vents, heaters, and the like. These remote control assemblies typically include a flexible conduit with a motion transmitting core movably supported in the conduit and an end fitting secured to one end of the conduit with the core element extending into the end fitting. Normally, a slide rod is slidably disposed in and extends from the fitting and is secured to the core element at one end and has a knob attached at the other end so that the knob may be manually grasped for moving the slide rod into and out of the fitting. Another type of control assembly is one wherein a control member or tab extends away from the core element in a direction which is substantially transverse to the core element. In such an assembly, a plastic fitting is secured to the end of the conduit and has a slideway or an elongated groove in which a slider member is slidably disposed. A tab extends from the slider member in a direction which is generally transverse to the core element so that it may be manually grasped for moving the slider member along the groove in the fitting for moving the core element. Although such assemblies perform very well in most instances, it is frequently difficult to maintain the proper tolerances in the component parts among the various different assemblies such as to provide a constant resistance to the movement of the slider member relative to the fitting. To overcome this problem a control assembly has been developed which includes a fitting or control body having a wall with an elongated slot therein and a slider member slidably supported by the control body for bearing engagement with one face of the wall and extending through the slot with a generally truncated cone-like member snapped onto and retained on the slider member for bearing engagement with the opposite face of the wall for providing a predetermined resistance to the sliding movement of the slider member. The slider member has a tab extending generally transversely away from the wall on the side thereof opposite to the truncated cone-like member. These control assemblies indeed solve the problem for which they were invented. In some instances, however, the use of such assemblies requires a tab which extends a relatively great distance from the wall in which the slot is disposed. In such instances, when forces are applied to the outward end of the tab member for moving the slider member, a large mechanical advantage produces moments and resulting excessive forces which urge the cone-like member into binding engagement with the control body to resist sliding movement. Frequently, the forces resulting from the mechanical advantage or moment are sufficient to force the cone-like member into binding frictional engagement with the control body which prevents the slider member from moving along the slot in the control body.

Accordingly, it is an object and feature of this invention to provide an improved remote control assembly of the type having a manually graspable tab extending substantially transversely away from the core element with means movable therewith for attenuating the mechanical advantage and the resulting excessive forces which resist movement as forces are applied to the tab.

Another object and feature of this invention is to provide a remote control assembly of the foregoing type which reduces the wear between the sliding components thereof to provide longer life under greater loads.

Other objects and attendant advantages of the present invention will be readily appreciated as the same becomes better understood by reference to the following detailed description when considered in connection with the accompanying drawings wherein.

Figure 4:
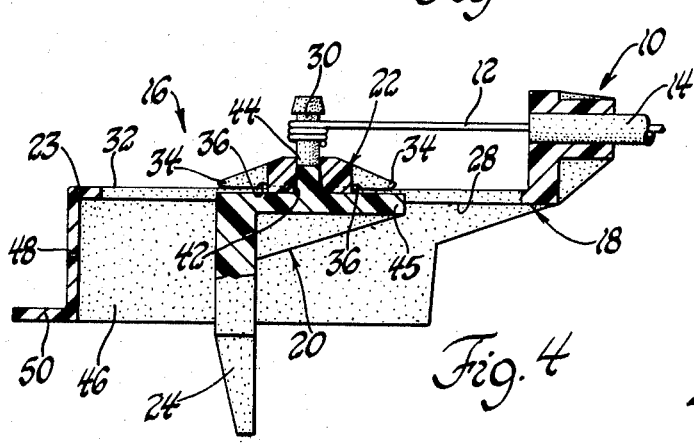
FIG. 4 is a cross-sectional view taken substantially along line 4—4 of FIG. 2.

Referring now to the drawings wherein like numerals indicate like or corresponding parts, a remote control assembly constructed in accordance with the instant invention is generally indicated at 10. The remote control assembly is of the type which is operated to control a device by transmitting tension or compression in a curved path by a flexible core element 12. The core element 12, as illustrated, is a wire like member. The entire remote control assembly 10 includes a core element 12, a flexible conduit 14, and the head assembly, which is generally indicated at 16. The conduit 14 movably supports the core element 12 and is attached to the head assembly 16 in an appropriate manner as by having a portion thereof molded thereabout as indicated in FIG. 4.

The head assembly 16 includes a control body generally indicated at 18, a slider member generally indicated at 20, and the means generally indicated at 22. The slider member 20 is slidably supported along a portion 23 of the control body 18. The slider member 20 includes a manually graspable tab 24 extending a relatively large distance away from the portion 23 of the control body 18 for moving the slider member 20 along the portion 23. The means 22 is movable with the slider member 20 to maintain the latter in sliding engagement with the control body 18 and for attenuating the mechanical advantage and the resulting excessive forces which resist sliding movement as forces are applied to the tab 24 and at the same time while providing a predetermined resistance to the sliding movement of the slider member. In other words, as forces are applied to the tab 24 to move the slider member 20 along the control body 18, moments and mechanical advantages push or urge the means 22 against the control body 18 but the means 22 is constructed to attenuate these forces so that they do no cause the means 22 to be forced into binding frictional engagement with the control body 18 to the extent that the slider member 20 would be prevented from moving along the control body 18.

Figure 5:
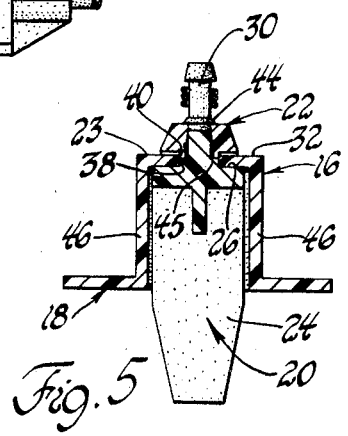
FIG. 5 is a cross-sectional view taken substantially along line 5—5 of FIG. 1.

The portion 23 of the control body 18 comprises a wall, hereinafter referred to as wall 23, and the slider member 20 includes a bearing portion 26 in sliding engagement with a first face 28 of the wall 23, all best illustrated in FIG. 5. The slider member 20 includes a post portion 30 which supports the means 22 so that the means 22 is in sliding engagement with a second face 32 of the wall 23.

Figure 1:
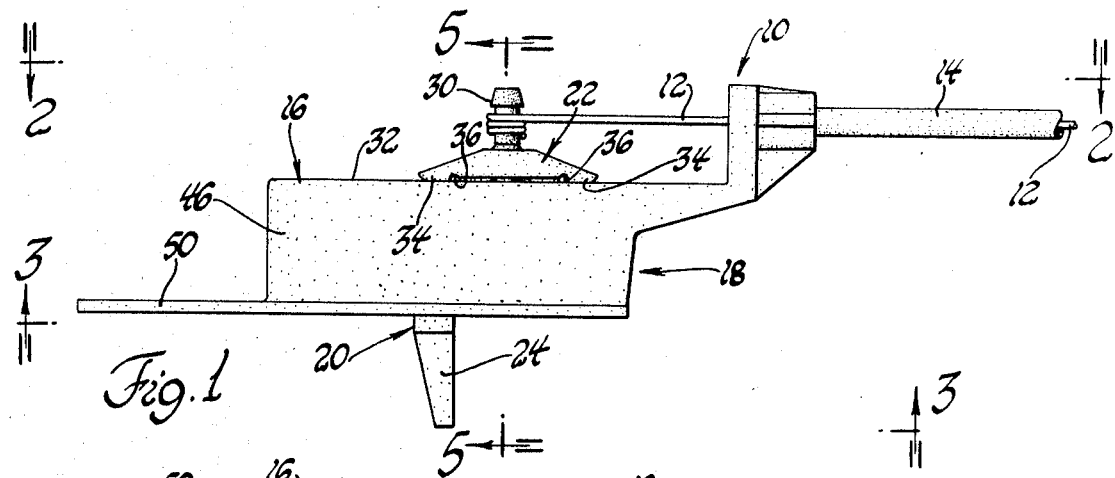
FIG. 1 is an elevational view of a preferred embodiment of the instant invention.
Figure 2:
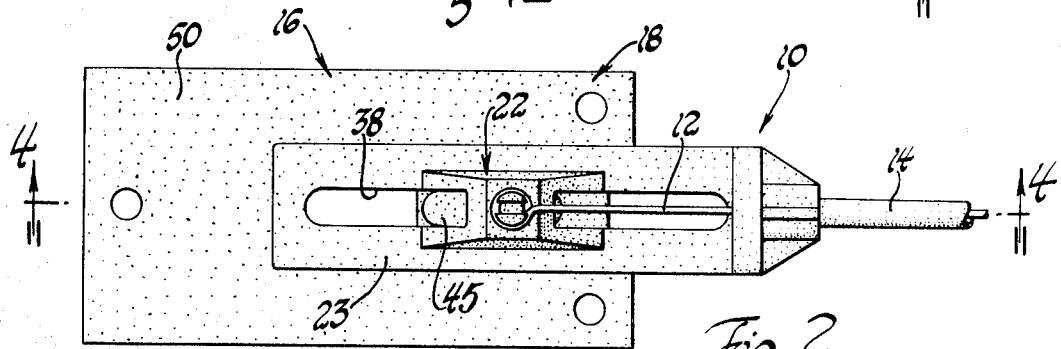
FIG. 2 is a view taken substantially along line 2—2 of FIG. 1.
Figure 3:
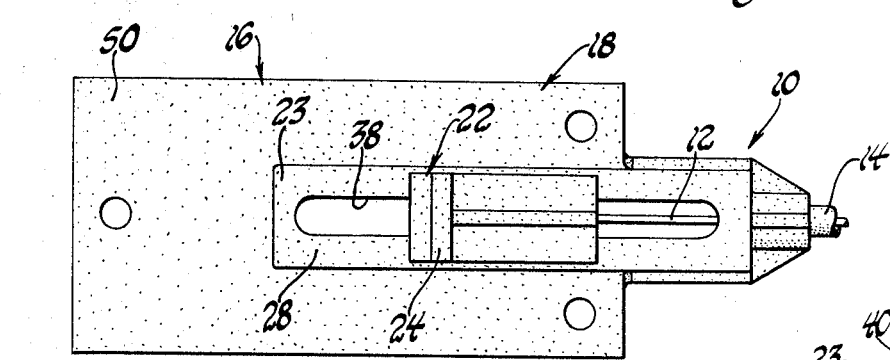
FIG. 3 is a view taken substantially along line 3—3 of FIG. 1.

The means 22 comprises an elongated member with pads 34 in sliding engagement with the second face 32 of the wall 23. The pads 34 are disposed at each end of the elongated member and the central portion of the elongated member is spaced upwardly from the second face 32 of the wall 23, as is best illustrated in FIG. 1. There is also included resilient means comprising a portion of the elongated member with the recesses 36 therein for connecting each pad 34 to the remainder of the elongated member for allowing the pads 34 to flex relative thereto. In other words, there is provided a weakened portion adjacent each of the pads 34 so that each of the pads 34 may flex relative to the remainder of the elongated member. This flexibility helps prevent the pads 34 from being forced into frictional binding engagement with the second face 32 of the wall 23 to the extent that it could prevent the slider member 20 from moving along the control body 18. In addition, each of the pads 34 is curved away from the second face 32 at each end of the elongated member as is best illustrated in FIGS. 1 and 4.

The wall 23 has an elongated slot 38 therein and the post 30 extends upwardly through the slot 38 and the elongated member is disposed on the post 30. The elongated member includes a pair of pads 34 at each end thereof and there is a space disposed between the pads of each pair so that the pads are in sliding engagement with the face 32 on each side of the slot 38. The elongated member includes a central guide portion 40 which extends into the slot 38 to prevent rotary movement of the elongated member relative to the control body 18. The elongated member also has a hole 42 extending therethrough as best illustrated in FIG. 4. The post 30 extends through the hole and includes a means comprising a tapered ring 44 coacting with the elongated member so that the elongated member is snapped into and retained in position on the post 30 for bearing engagement with the control body 18. The hole 42 is tapered outwardly from the post in a direction toward the second face 32 of the wall 23. This taper allows the post 30 to move relative to the elongated member when excessive forces are applied to the tab 24 thus preventing the pads 34 from being forced into frictional binding engagement with the face 32.

The slider member 20 includes a guide portion 45 which extends into the slot 38 for preventing rotation of the slider member 20 relative to the control body 18.

The control body 18 includes a pair of sides 46 and an interconnecting end 48 all of which extend from the wall 23 in the same direction as the tab 24. The tab 24, however, extends farther from the wall 23 than the sides mechanical advantage and moment when forces are applied thereto for moving the slider member 20 along the control body 18. The means 22 comprising the elongated member, however, attenuates this mechanical advantage and the resulting excessive forces therefrom so that the elongated member and the tabs 34 thereof are not forced into frictional binding engagement with the face 32 to the extent to prevent sliding movement of the slider member 20. There is also included a support flange 50 adapted by holes for attachment to a support structure such as the dashboard in an automobile.

It will be noted that the end of the core element 12 has a pigtail or plurality of coils which are snapped onto the post 30 and retained thereon due to the fact that the upward end of the post 30 has a tapered head thereon. Before the core element 12 is attached to the post 30, however, the means 22 is snapped onto the post 30 so as to be retained thereon to maintain the slider member 20 in sliding engagement with the control body 18.

In the preferred embodiment, the major components, to-wit; the slider member 20, the control body 18, and the means 22, are made of plastic or organic polymeric materials.

This invention, therefore, provides a means 22 which allows the utilization of an extremely long tab 24 so that the slider member 20 is always slidable along the control body 18 regardless of the mechanical advantage and the moments which result from the forces applied to the tab in urging the slider member 20 along the control body 18.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A head assembly for a motion transmitting remote control assembly of the type which is operated to control a device by transmitting tension or compression in a curved path by a flexible core element, said assembly comprising; a control body, a slider member slidably supported along a portion of said control body, said slider member including a manually graspable tab extending away from said portion of said control body for moving said slider member along said portion, and means movable with said slider member to maintain the latter in sliding engagement with said control body for attenuating the mechanical advantage and the resulting excessive forces which resist sliding movement as forces are applied to said tab while providing a predetermined resistance to sliding movement of said slider member which results from the forces applied to said tab, said means comprising an elongated member with pads in sliding engagement with said portion of said control body.

2. An assembly as set forth in claim 1 wherein said portion of said control body comprises a wall, said slider member includes a bearing portion in sliding engagement with a first face of said wall and another portion supporting said elongated member so that said elongated member is in sliding engagement with a second face of said wall.

3. An assembly as set forth in claim 2 wherein said pads are disposed at each end of said elongated member.

4. An assembly as set forth in claim 3 including resilient means connecting each pad to the remainder of said elongated member for allowing said pads to flex relative thereto.

5. An assembly as set forth in claim 4 wherein said pads are curved away from said second face of said wall at each end of said elongated member.

6. An assembly as set forth in claim 5 wherein said wall has an elongated slot therein, said slider member includes a post extending through said slot, said elongated member being disposed on said post.

7. An assembly as set forth in claim 6 wherein said elongated member includes a pair of said pads at each end thereof with a space between the pads of each pair.

8. An assembly as set forth in claim 7 wherein said resilient means includes a portion of said elongated member with a recess therein to provide a weakened portion adjacent each of said pads.

9. An assembly as set forth in claim 8 wherein said elongated member includes a central guide portion extending into said slot to prevent rotary movement of said elongated member in said slot.

10. An assembly as set forth in claim 9 wherein said elongated member has a hole therethrough, said post extending through said hole and includes means coacting with said elongated member so that the latter is snapped into and retained in position on said post.

11. An assembly as set forth in claim 10 wherein said hole in said elongated member is tapered outwardly from said post in a direction toward said second face of said wall.

12. An assembly as set forth in claim 11 wherein said slider member includes a guide portion extending into said slot for preventing rotation of said slider member relative to said control body.

13. An assembly as set forth in claim 12 including a conduit attached to said control body, and a core element extending from said conduit and attached to said post of said slider member.

14. An assembly as set forth in claim 13 wherein said control body includes a pair of sides and an interconnecting end extending from said wall in the direction of said tab.

15. An assembly as set forth in claim 14 wherein said tab extends farther from said wall than said sides and said end.

16. An assembly as set forth in claim 15 wherein said control body, said slider member and said elongated member are made of plastic.

References Cited

UNITED STATES PATENTS

| | | | |
|---|---|---|---|
| 2,620,596 | 12/1952 | Abrahamson | 74—501 |
| 2,844,999 | 7/1958 | Wendela | 74—491 |
| 3,342,081 | 9/1967 | Conrad | 74—501 |
| 3,348,428 | 10/1967 | Shaeffer | 74—502 |
| 3,398,600 | 8/1968 | White et al. | 74—501 |

FRED C. MATTERN, JR., Primary Examiner

C. F. GREEN, Assistant Examiner